(12) United States Patent
Matthes

(10) Patent No.: US 8,681,762 B2
(45) Date of Patent: Mar. 25, 2014

(54) SORTING FREQUENCY ARRAYS TO ACCOUNT FOR MULTI-PROTOCOL FREQUENCIES

(75) Inventor: Katrin Matthes, Mougins (FR)

(73) Assignee: Texas Instruments Incorporated, Dallas, TX (US)

( * ) Notice: Subject to any disclaimer, the term of this patent is extended or adjusted under 35 U.S.C. 154(b) by 1286 days.

(21) Appl. No.: 12/129,187

(22) Filed: May 29, 2008

(65) Prior Publication Data

US 2009/0232120 A1     Sep. 17, 2009

(30) Foreign Application Priority Data

Mar. 12, 2008   (EP) ..................................... 08290236

(51) Int. Cl.
     *H04B 7/216* (2006.01)
(52) U.S. Cl.
     USPC ........... 370/342; 370/328; 370/329; 370/330; 370/344; 455/63.2; 455/161.1; 455/450
(58) Field of Classification Search
     None
     See application file for complete search history.

(56) References Cited

U.S. PATENT DOCUMENTS

| 5,884,145 | A  | * | 3/1999  | Haartsen ...................... 455/63.2 |
| 6,351,643 | B1 | * | 2/2002  | Haartsen ....................... 455/450 |
| 6,519,236 | B1 | * | 2/2003  | Haartsen et al. .............. 370/332 |
| 6,597,671 | B1 | * | 7/2003  | Ahmadi et al. ............... 370/329 |
| 6,751,249 | B1 | * | 6/2004  | Cannon et al. ................ 375/133 |
| 7,167,696 | B2 | * | 1/2007  | Backes et al. .............. 455/161.1 |
| 2003/0181211 | A1 | * | 9/2003 | Razavilar et al. ............ 455/450 |
| 2003/0193923 | A1 | * | 10/2003 | Abdelgany et al. .......... 370/342 |
| 2005/0059401 | A1 | * | 3/2005 | Chen et al. .................... 455/437 |
| 2005/0265273 | A1 | * | 12/2005 | Karabinis et al. ............. 370/316 |

* cited by examiner

*Primary Examiner* — Ian N Moore
*Assistant Examiner* — Brian T Le
(74) *Attorney, Agent, or Firm* — Alan A. R. Cooper; W. James Brady, III; Frederick J. Telecky, Jr.

(57) ABSTRACT

A system comprises transceiver logic that receives signals on each of an array of frequencies. The transceiver logic is adapted to communicate using a first communication protocol. Processing logic couples to the transceiver logic. The processing logic identifies from among the array of frequencies a subset of shared frequencies that carry data transmitted using a second communication protocol. The processing logic adjusts frequency selection parameters in accordance with the identification. The processing logic uses the adjusted frequency selection parameters to select a target frequency from the array of frequencies to carry data.

17 Claims, 4 Drawing Sheets

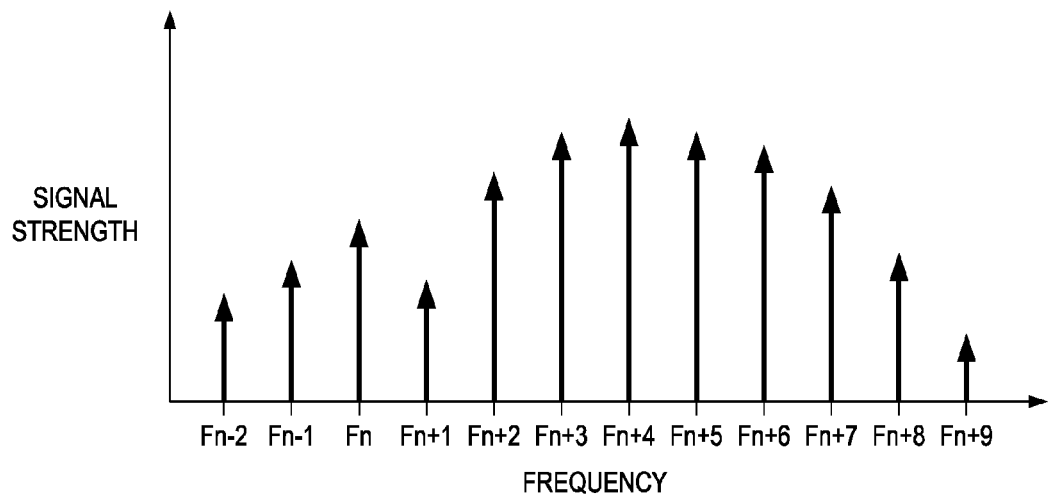
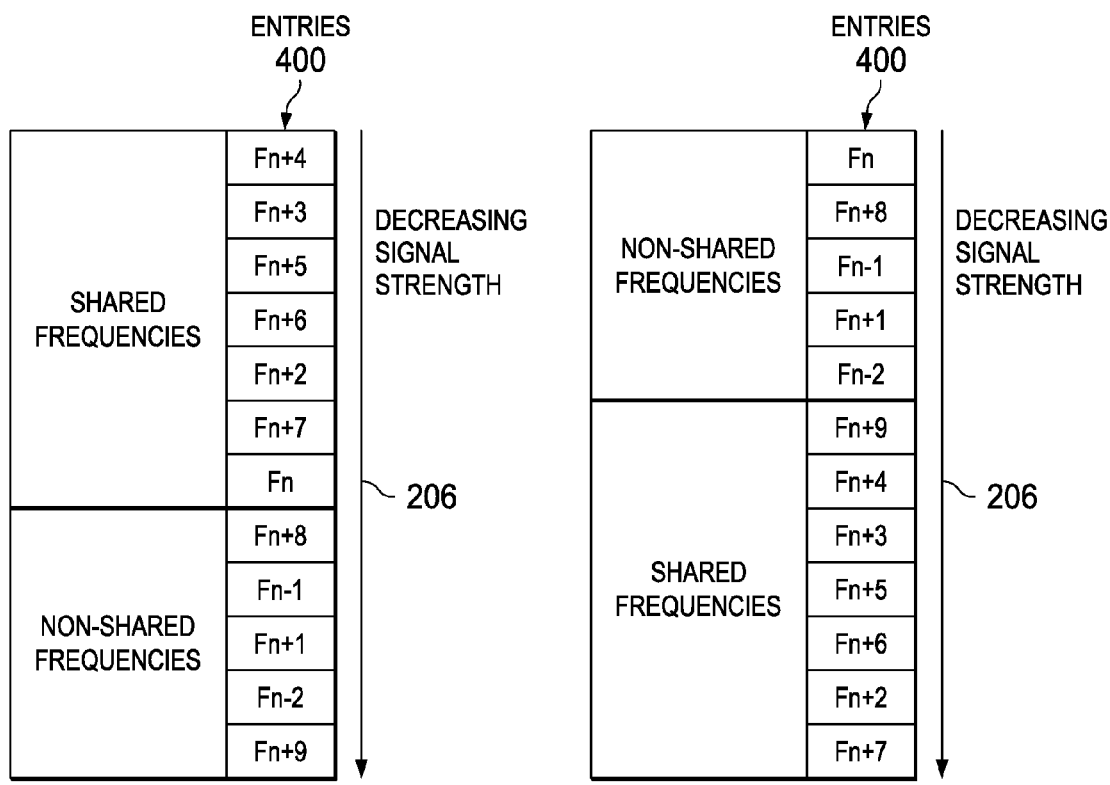

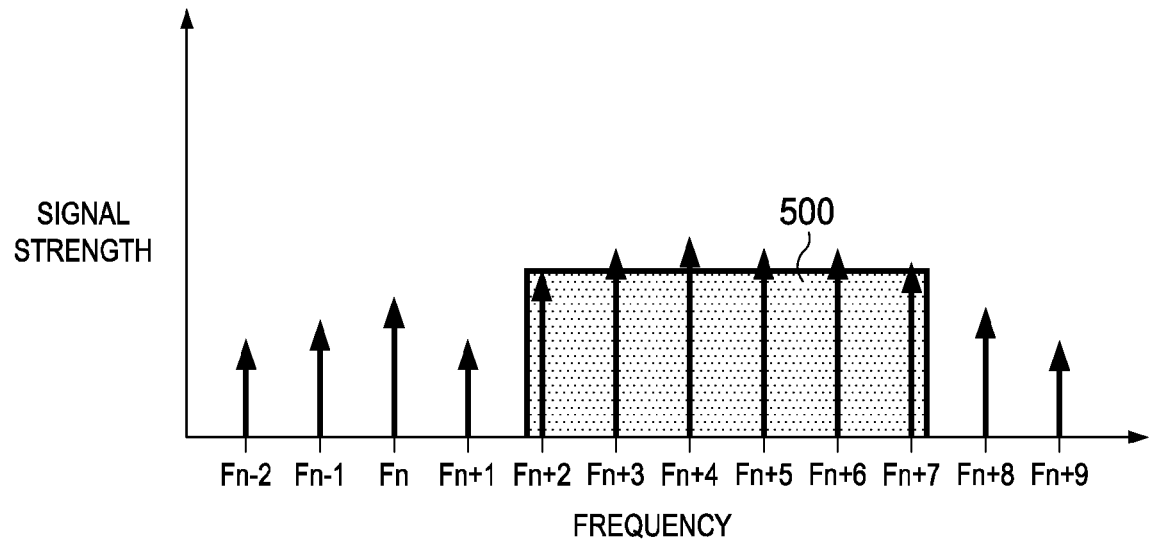
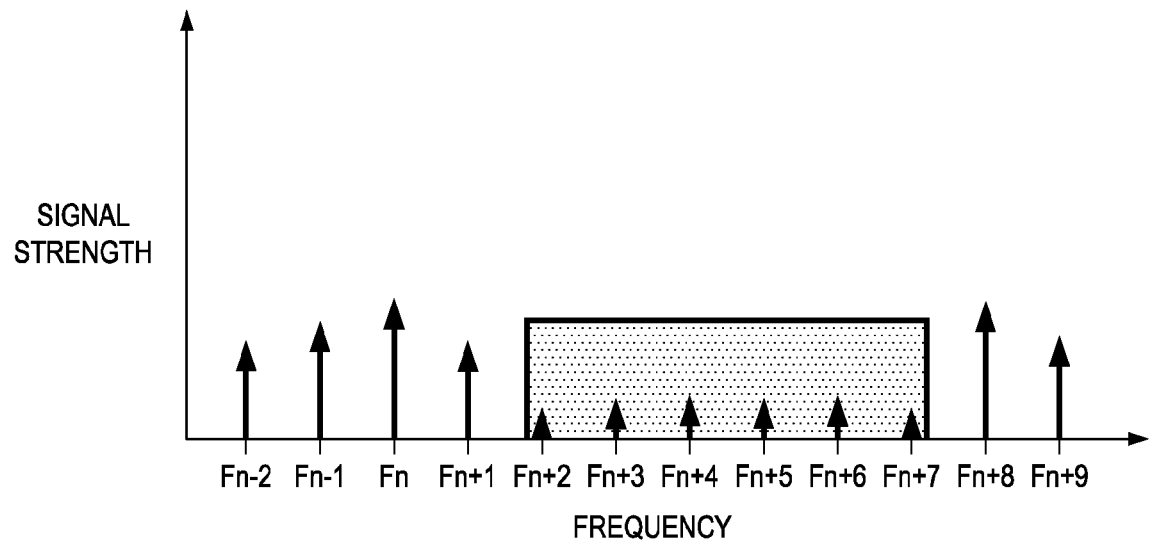

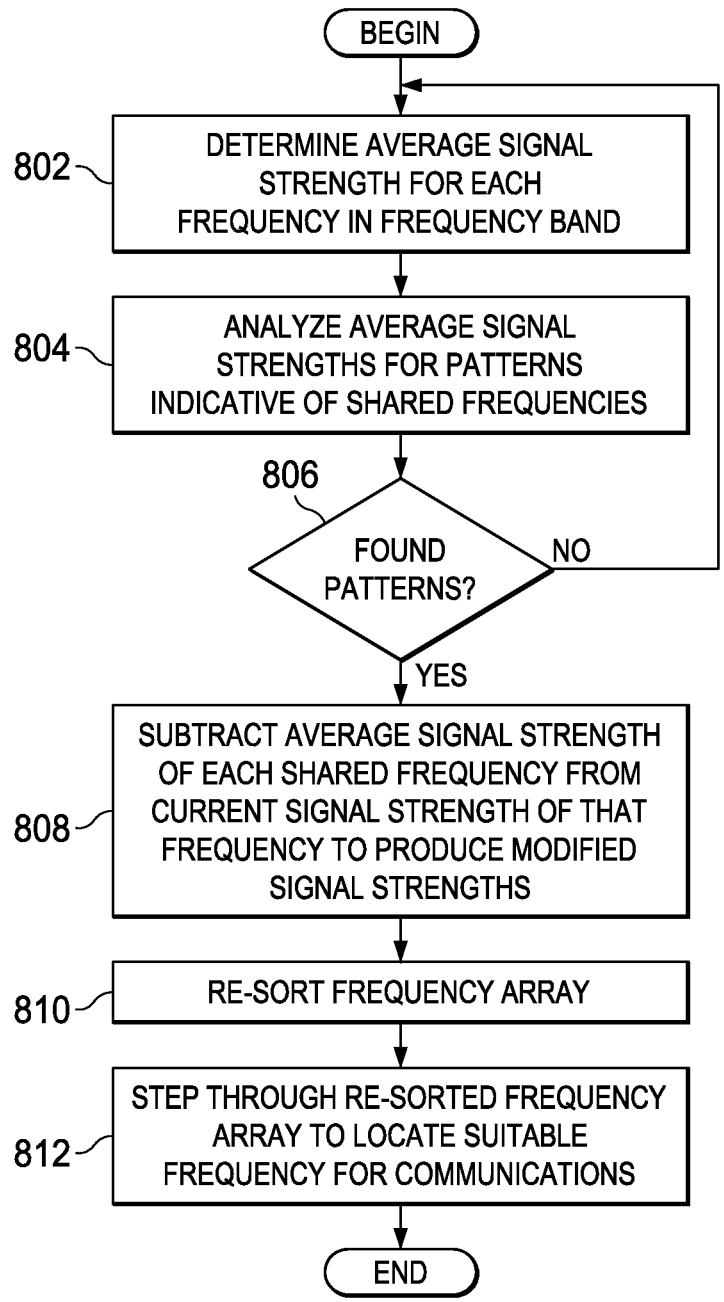

US 8,681,762 B2

SORTING FREQUENCY ARRAYS TO ACCOUNT FOR MULTI-PROTOCOL FREQUENCIES

CROSS-REFERENCE TO RELATED APPLICATIONS

This application is a non-provisional application claiming priority to European Patent Application Serial No. 08290236.2 filed Mar. 12, 2008, and incorporated herein by reference.

BACKGROUND

Mobile communication devices, such as cellular telephones, communicate with other communication devices via one or more networks. Such networks may implement any of a variety of protocols, including Global System for Mobile Communication (GSM), Code Division Multiple Access (CDMA) and Wideband CDMA (W-CDMA). Often, the protocol may use a frequency band that overlaps with the frequency band of another protocol. For example, protocol A may operate on a frequency band of 1900-1950 MHz, while protocol B operates on a frequency band of 1945-2000 MHz. In this example, protocols A and B overlap between 1945 MHz and 1950 MHz.

Such overlap can cause operating errors on mobile devices. For example, a mobile device may be designed to communicate using only protocol A when using a frequency of 1947 MHz. However, the frequency 1947 MHz is a shared frequency because protocol B is also able to send and receive data on that frequency. Thus, if, while the mobile device is communicating using protocol A on 1947 MHz, data is sent on 1947 MHz using protocol B, the mobile device becomes "confused" and is unable to properly communicate using protocol A, as it was intended to do. If several frequencies are shared between multiple protocols, it may take an undesirably long time for a mobile device to locate a suitable frequency on which to transmit or receive data. If an excessive number of frequencies is shared between multiple protocols, a mobile device may become incapacitated, unable to send or receive signals on any frequency at all.

SUMMARY

The problems noted above are solved in large part by a technique for sorting frequency arrays to account for frequencies shared among multiple wireless communication protocols. An illustrative embodiment includes a system comprises transceiver logic that receives signals on each of an array of frequencies. The transceiver logic is adapted to communicate using a first communication protocol. Processing logic couples to the transceiver logic. The processing logic identifies from among the array of frequencies a subset of shared frequencies that carry data transmitted using a second communication protocol. The processing logic adjusts frequency selection parameters in accordance with the identification. The processing logic uses the adjusted frequency selection parameters to select a target frequency from the array of frequencies to carry data.

Another illustrative embodiment includes a computer-readable medium encoded with software which, when executed, causes a processor to sort a set of frequencies, where a first subset of the frequencies corresponds to signals that have been transmitted using a first wireless communication protocol and a second subset of the frequencies corresponds to signals that have been transmitted using a second wireless communication protocol. For at least one of the first subset of frequencies, the processor determines a difference between a first signal strength value and an average signal strength value, where the average signal strength value is indicative of the average signal strength for signals received on the at least one of the first subset of frequencies. The processor also re-sorts the set of frequencies in accordance with the difference. The processor further transmits or receives data on a target frequency selected from the re-sorted set of frequencies.

Yet another illustrative embodiment includes a method that comprises determining an average signal strength of signals received on a shared frequency carrier, with the shared frequency carrier usable by different communication protocols. The method also comprises determining a difference between the average signal strength and a signal strength of another signal received on the shared frequency carrier to produce a modified signal strength. The method further comprises sorting a plurality of frequency carriers, including the shared frequency carrier, based on the modified signal strength. The method still further comprises transmitting or receiving data on a target frequency carrier selected using the sorted frequency carriers.

BRIEF DESCRIPTION OF THE DRAWINGS

For a detailed description of exemplary embodiments of the invention, reference will now be made to the accompanying drawings in which:

FIG. 3 shows a graph that depicts the relative signal strengths of a base tower signal on various frequencies, in accordance with embodiments;

FIG. 4 shows a data structure that orders the frequencies of FIG. 3 according to the frequencies' signal strengths, in accordance with embodiments;

FIG. 5 shows the graph of FIG. 3 with a shaded area indicating an average signal strength of signals on a set of shared frequencies, in accordance with embodiments;

FIG. 6 shows the graph of FIG. 5, except with the average signal strength subtracted from the set of shared frequencies, in accordance with embodiments;

FIG. 7 shows the data structure of FIG. 4, except the contents of the data structure have been sorted according to the frequency signal strengths shown in FIG. 6, in accordance with embodiments; and FIG. 8 shows a flow diagram of an illustrative method implemented in accordance with embodiments.

NOTATION AND NOMENCLATURE

Figure 1:
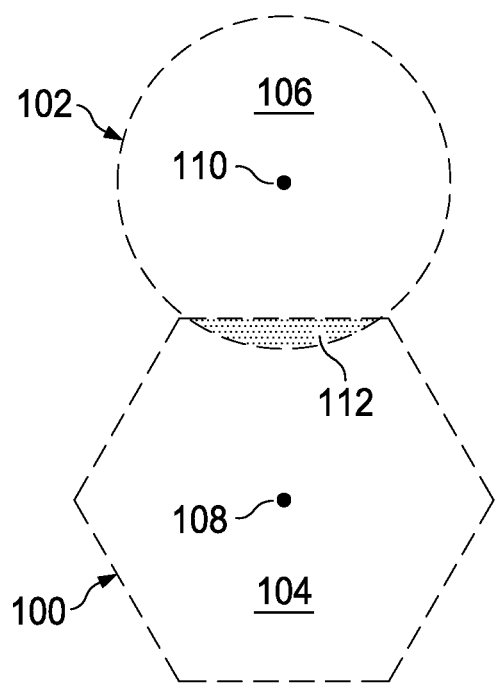
FIG. 1 shows an illustrative pair of adjacent networks in which the technique disclosed herein may be implemented, in accordance with embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The terms "cellular telephone," "cell phone," "mobile," "mobile phone," "handy," "mobile communication device," etc., regardless of whether they are all used in herein, are generally synonymous.

In the context of multiple communication towers broadcasting and receiving data using different communication protocols, a "shared frequency" is a frequency on which a mobile device can transmit or receive data using more than one wireless communication protocol, where such communication with more than one protocol is undesirable. Thus, for example, if a mobile device is intended to operate on a GSM network on a certain frequency, but a neighboring CDMA or W-CDMA network also communicates on that frequency, the frequency is a shared frequency. The fact that the CDMA/W-CDMA network uses the shared frequency interferes with the mobile device's ability to communicate on the GSM network.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

When implemented, the technique disclosed herein causes a mobile device to transmit and receive data on a frequency that is selected from a sorted array of frequencies. The array of frequencies is sorted such that, in general, frequencies that do not overlap among multiple protocols are first, while frequencies that overlap among multiple protocols are last. The mobile device selects frequencies from the array in the order that the frequencies are sorted (i.e., in sequential order), so that the device generally attempts to use non-overlapping (or "non-shared") frequencies first and overlapping (or "shared") frequencies last. By sorting the array of frequencies in this way, the amount of time it takes a mobile device to locate a suitable frequency that is not shared among multiple protocols is substantially reduced when compared to devices not implementing the technique disclosed herein.

FIG. 1 shows a conceptual illustration of multiple mobile communication networks 100, 102. The networks 100 and 102 implement different wireless communication protocols. For example, in at least some embodiments, the network 100 implements a Global System for Mobile Communication (GSM) protocol and the network 102 implements either a Code Division Multiple Access (CDMA) protocol or a Wideband CDMA (W-CDMA) protocol. The network 100 comprises a cell 104 that is provided wireless communication access by a tower 108. The network 102 comprises a cell 106 that is provided wireless communication access by a tower 110.

When a mobile device is located close to the tower 108, the mobile device is able to use some or all of the frequencies in its array of frequencies, because the signal strength of the signal emitted by the tower 108 is stronger than the signal strength of the signal emitted by the tower 110, across most or all frequencies. However, when the mobile device is located closer to an outer border of the cell 104—for example, close to a border between the cell 104 and the cell 106 (e.g., overlapping area 112)—the signal strength from the tower 110 may overpower the signal strength from the tower 108 on at least some frequencies on which the mobile device may operate. Even if the signal strength from the tower 110 does not overpower the signal strength from the tower 108, it still may be powerful enough to make communication on those frequencies prohibitively poor. In some cases, signals from the tower 108 may be absent such that on these frequencies the mobile device receives signals only from tower 110. The problematic frequencies tend to be "shared frequencies"—those that can be used by either of the communication protocols implemented in towers 108 and 110. A mobile device that implements the technique disclosed herein overcomes this problem as now described.

Figure 2:
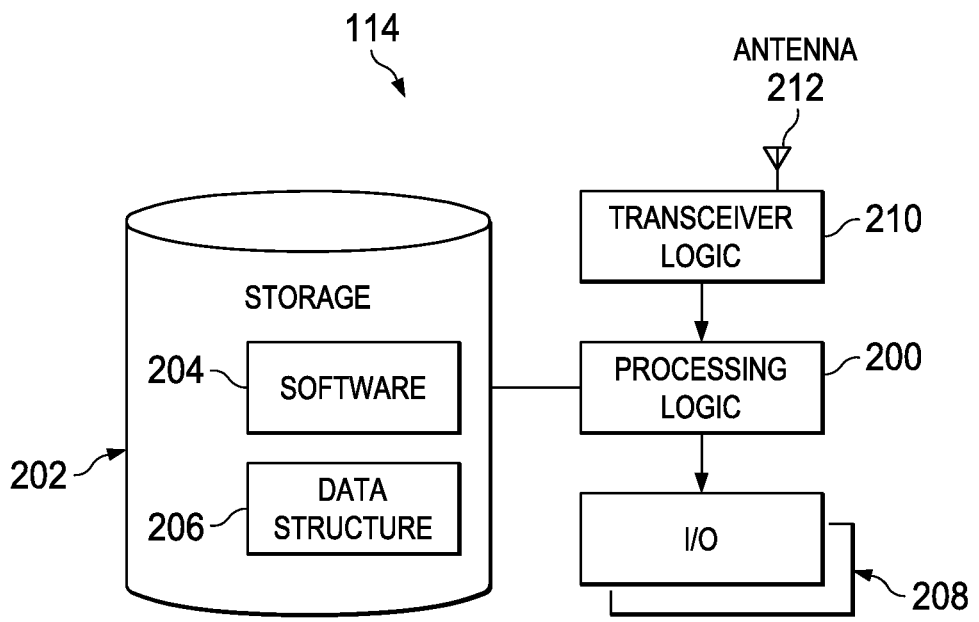
FIG. 2 shows an illustrative block diagram of a mobile communication device that implements the technique disclosed herein, in accordance with embodiments.

FIG. 2 shows a block diagram of the components of a mobile device 114. The mobile device 114 comprises processing logic 200 (e.g., digital signal processor), storage (e.g., RAM) 202 comprising software 204 and a data structure 206, input/output (I/O) devices 208, transceiver logic 210 and an antenna 212. When executed by the processing logic 200, the software 204 causes the processing logic 200 to implement the technique disclosed herein. The mobile device 114 transmits and/or receives signals from the towers 108 and 112 using the transceiver logic 210 and the antenna 212. The transceiver logic 210 and/or the processing logic 200 are adapted to determine signal strengths of received signals using any suitable method (e.g., Received Signal Strength Indication (RSSI)). The software 204 and the processing logic 200 use the data structure 206 to store the array of frequencies mentioned above and described in further detail below.

FIG. 3 shows a graph 300 illustrating various frequencies on which the mobile device 114 may transmit signals to and/or receive signals from the tower 108 and/or tower 110. These frequencies may comprise, for example, some or all of the frequencies in the frequency band assigned to a particular communication protocol (e.g., GSM) by the appropriate governing authority (e.g., Federal Communications Commission (FCC)). The frequency array shown in FIG. 3 includes only a portion of all frequencies supported by the mobile device 114, but is illustrative of all supported frequencies for purposes of this discussion. The graph 300 shows the signal strength associated with each of these frequencies. Signal strength may be affected by various factors, including distance between the mobile device and a tower, obstructions between the mobile device and the tower, etc. The mobile device 114 determines the information shown in graph 300 using its antenna 212 and transceiver logic 210 (i.e., by determining RSSI). The frequencies in the graph 300 are labeled Fn−2, Fn−1, Fn, Fn+1, Fn+2, Fn+3 . . . Fn+9. Although only twelve frequencies are shown in the graph 300, any number of frequencies may be used. Preferably, neighboring frequencies are used on different network cells to reduce inter-carrier interference. Thus, for example, frequencies Fn and Fn+1 may be used as frequency carriers in different cells, while frequencies Fn and Fn+9 may be used as frequency carriers in the same cell.

FIG. 4 shows the data structure 206 in detail. The data structure 206 comprises a plurality of entries 400. Each entry 400 comprises a distinct frequency on which the mobile device 114 may communicate with the tower 108 using a protocol suitable for the mobile device 114 and the tower 108. Specifically, each entry 400 comprises a different one of the frequencies shown in the graph 300 of FIG. 3. The frequency array shown in FIG. 4 includes only a portion of all frequencies supported by the mobile device 114, but is illustrative of all supported frequencies for purposes of this discussion. The processing logic 200 sorts the array of frequencies in the data structure 206 based on signal strength. The processing logic 200 preferably sorts the array of frequencies in descending order of signal strength. Thus, as shown in the graph 300, the frequency Fn+4 has the highest signal strength and so the frequency Fn+4 is first in the data structure 206. The frequency Fn+9 has the lowest signal strength and so the frequency Fn+9 is last in the data structure 206.

When transmitting and/or receiving signals, the processing logic 200 uses frequencies selected from the frequency array in the data structure 206. The data structure 206 and its contents are therefore referred to as "frequency selection parameters." Preferably, because the frequency array in the data structure 206 has been arranged in order of descending signal strength, the processing logic 200 "starts at the beginning" of the array by first selecting the frequency with the highest signal strength. Thus, referring to FIG. 4, the processing logic 200 may begin with Fn+4. If the processing logic 200 determines that the first frequency in the data structure 206 is unsuitable for communication with the tower 108, the processing logic 200 stops using the first frequency and attempts to use the next frequency in line (e.g., in FIG. 4, Fn+3). The processing logic 200 "steps through" each of the frequencies in the data structure 206 (i.e., in a sequential manner) until a suitable frequency is found. The criteria for a "suitable frequency" may include the fact that the processing logic 200 is able to synchronize on the frequency and that cell selection criteria for this frequency are fulfilled according to applicable standards defining the communication protocol.

As explained, although the mobile device 114 is programmed to communicate with the tower 108 using a corresponding protocol (e.g., GSM), the tower 110 may transmit/receive data using a different protocol (e.g., CDMA or W-CDMA) on some or all of the frequencies in the frequency array of data structure 206. In accordance with embodiments, the processing logic 200 of mobile device 114 determines the signal strengths of signals received on the frequencies it may use based on its current location and communication protocol, determines an average signal strength for each frequency and the variance of the shared frequencies, "looks" for patterns among these average signal strengths to identify frequencies (i.e., "shared frequencies") that are being used by the communication protocol of tower 110, subtracts the average signal strength of each shared frequency from the current signal strength of that shared frequency to produce a modified set of signal strengths, and re-sorts the frequencies in the data structure 206 based on this modified set of signal strengths. Each part of this technique is now discussed in turn.

The processing logic 200 determines which of the frequencies in the data structure 206 are shared frequencies (i.e., frequencies that are usable by both communication protocols on towers 108 and 110 and that are used at least by tower 110) as follows. First, the processing logic 200 captures multiple samples (e.g., five samples; in some embodiments, at least two) of signals received on all frequency bands supported by the mobile device, including each of these frequencies. The processing logic 200 determines an RSSI level for each of these samples. Thus, for each frequency in the data structure 206, the processing logic 200 determines five distinct RSSI levels, each of which is indicative of the strength of a signal received on that frequency. For each of the frequencies in the data structure 206, the processing logic 200 then averages the multiple RSSI levels to obtain an average signal strength level. Thus, for the data structure 206, the processing logic 200 determines a total of 12 average signal strengths. Again, as explained above, the data structure represents only a portion of a complete data structure containing all supported frequencies.

Shared frequencies can be identified among the frequencies in the data structure 206 by looking for certain patterns among these 12 average signal strengths. Specifically, if between approximately 5-6 adjacent frequency carriers are noted to have the same or similar average signal strengths, it is likely that those frequency carriers are shared frequencies. It is particularly likely that those frequency carriers are shared between a GSM network (e.g., the network 100 of tower 108) and a CDMA network (e.g., the network 102 of tower 110). Further, if 7 or more adjacent frequency carriers are observed to have the same or similar average signal strengths, it is likely that those frequency carriers are shared frequencies. It is particularly likely that those frequency carriers are shared among a GSM network (e.g., the network 100 of tower 108) and a W-CDMA network (e.g., the network 102 of tower 110). Other such pattern-recognizing techniques may be performed by the processing logic 200 to identify shared frequencies. The device 114 may be programmed to recognize any such type of pattern, as desired. In some embodiments, the processing logic 200 may ensure that it has correctly identified shared frequencies by determining whether the suspected shared frequencies comprise Gaussian Minimum Shift-Keying (GMSK) modulated signals. If the suspected shared frequency does not comprise a GMSK modulated signal, then it is more likely to be a shared frequency. Assume, for purposes of this discussion, that among the frequencies of the data structure 206, the processing logic 200 recognizes a pattern among frequencies Fn+2, . . . , Fn+7. That is, the processing logic 200 determines that the average signal strengths for the frequencies Fn+2, . . . , Fn+7 are within a certain, predetermined range of each other (e.g., the variance among the shared frequencies is less than the square of 10% of the average of the shared frequencies). Thus, the processing logic 200 has determined the frequencies Fn+2, . . . , Fn+7 to be shared frequencies and the remaining frequencies to be non-shared frequencies.

As previously explained, shared frequencies are undesirable for communications due to their interference levels and poor signal quality. Thus, once the shared frequencies have been identified, the processing logic 200 re-arranges, or re-sorts, the data structure 206 so that the shared frequencies are moved to the "end of the line," while non-shared frequencies are moved to the "front of the line." When the processing logic 200 requires a frequency carrier on which to transmit or receive data, the processing logic 200 will begin "stepping through" the list of frequencies in the data structure 206 until a suitable frequency is found. Due to the aforementioned re-sorting, however, the processing logic 200 will attempt to use non-shared frequencies before it attempts to use shared-frequencies, since the shared frequencies have been moved to the "end of the line." As a result, the processing logic 200 finds a suitable frequency (i.e., a frequency that is only being used by the tower 108 and not by the tower 110) faster than it would have if the technique disclosed herein had not been implemented. The method by which the processing logic 200 identifies shared frequencies and determines an average signal strength has already been disclosed. The method by which the processing logic 200 re-sorts the data structure 206 is now described.

The processing logic 200 re-sorts the data structure 206 as follows. First, for each shared frequency Fn+2 . . . Fn+7, the processing logic 200 subtracts (i.e., determines the difference between) the average signal strength for that frequency from the signal strength of the signal currently being received on that frequency, thereby producing a modified signal strength. For example, refer to FIG. 5. FIG. 5 shows a graph 498 that is similar to graph 300. However, graph 498 depicts a shaded area 500. The shaded area 500 is indicative of a set of shared frequencies identified by the processing logic 200. The processing logic 200 identified this set of shared frequencies by calculating an average signal strength using multiple signal samples for each of the frequencies Fn−2, Fn−1, ..., Fn+9. The processing logic 200 further determined that the average signal strength for frequencies Fn+2, Fn+3, ..., Fn+7 were either identical or substantially similar (e.g., having a variance that is less than the square of 10% of the average of the shared frequencies). For this reason, the processing logic 200 determined that the frequencies Fn+2, Fn+3, ..., Fn+7 are likely to be shared frequencies (because there are 6 shared frequencies, the frequencies are likely to be shared between a GSM network and a CDMA network, as explained above). In accordance with embodiments, the processing logic 200 subtracts this average signal strength (indicated by shaded area 500) from the signal strengths of signals received on frequencies Fn+2, Fn+3, ..., Fn+7, thereby producing modified signal strengths.

Graph 598 of FIG. 6 shows the resulting modified signal strengths. Frequencies Fn−2, Fn−1, Fn, Fn+1, Fn+8 and Fn+9 are not shared frequencies, and so their signal strengths appear the same as in FIG. 5. However, frequencies Fn+2, Fn+3, ..., Fn+7 are shared frequencies and were subjected to the subtraction operation described above. Thus, the signal strengths of these shared frequencies are reduced, as shown in graph 598.

As previously explained, and as shown in FIG. 4, the data structure 206 is sorted in order of descending signal strength. The data structure 206 is sorted in this way so that, when the processing logic 200 steps through the data structure 206 sequentially to locate a suitable frequency to use, the processing logic 200 is most likely to use the strongest signals first and the weakest signals last. However, as shown in graph 598 of FIG. 6, the signal strengths of the frequencies have been modified. Therefore, the processing logic 200 re-sorts the data structure 206, taking into account the modified signal strengths shown in FIG. 5.

FIG. 7 shows the result of this re-sorting process. Specifically, FIG. 7 shows the data structure 206 having re-sorted entries 400. The entries 400 are re-sorted according to the modified signal strengths shown in FIG. 6. As shown, the shared frequencies Fn+2, Fn+3, ..., Fn+7, which previously were at the "front of the line" (i.e., were attempted by the processing logic 200 before other frequencies in the data structure), are now moved to the "back of the line." Conversely, the non-shared frequencies Fn−2, Fn−1, Fn, Fn+1, Fn+8 and Fn+9, which previously were at the back of the line, are now moved to the front of the line. Thus, when the processing logic 200 steps through the data structure 206 in an attempt to find a suitable frequency for use, the processing logic 200 will attempt to use the non-shared frequencies before it attempts to use the shared frequencies. Because the processing logic 200 attempts to use the non-shared frequencies first, not only is it more likely to find a suitable frequency, but it will find a suitable frequency faster than if this technique had not been implemented. Thus, after the frequency array is re-sorted, the processing logic 200 attempts to find a target frequency for data transmission by first attempting to use frequency Fn. Frequency Fn is likely to be successful due to good signal strength and lack of overlap with tower 110. However, if frequency Fn is unsuitable, the processing logic 200 may attempt to use Fn+8, Fn−1, Fn+1, Fn−2 and Fn+9 (in that order), each of which is likely to be successful due to good signal strength and lack of overlap with tower 110.

FIG. 8 shows a flow diagram of a method 800 implementing the technique disclosed herein. The method 800 may be executed by a mobile device, such as mobile device 114, described above. The method 800 begins by determining an average signal strength for each frequency in the frequency band available to the mobile device 114 (block 802). The method 800 also comprises analyzing the average signal strengths for patterns that are indicative of shared frequencies (e.g., a predetermined number of adjacent frequency carriers having the same or substantially similar average signal strengths) (block 804). If such a pattern is found (block 806), the method 800 comprises subtracting an average signal strength of each shared frequency from a current signal strength of that frequency to produce modified signal strengths (block 808). The method 800 then comprises re-sorting the frequency array (block 810) and "stepping through" the re-sorted frequency array, in sequential order, to locate a suitable frequency for wireless communications (block 812). The steps of the method 800 may be performed in any suitable order.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
   transceiver logic that receives signals on each of an array of frequencies, the transceiver logic adapted to communicate using a first communication protocol; and
   processing logic coupled to the transceiver logic, the processing logic identifies from among the array of frequencies a subset of shared frequencies that carry data transmitted using a second communication protocol, the processing logic adjusts frequency selection parameters in accordance with said identification;
   wherein the processing logic uses the adjusted frequency selection parameters to select a target frequency from the array of frequencies to carry data,
   wherein the processing logic adjusts the frequency selection parameters so that the processing logic attempts to find the target frequency among a subset of non-shared frequencies that carry data transmitted using the first communication protocol before the processing logic attempts to find the target frequency among the subset of shared frequencies.

2. The system of claim 1, wherein the system comprises a mobile communication device, the first communication protocol comprises Global System for Mobile Communication (GSM) and the second communication protocol comprises a protocol selected from the group consisting of Code Division Multiple Access (CDMA) and Wideband CDMA (W-CDMA).

3. The system of claim 1, wherein the system comprises a data structure having a plurality of entries, each entry corresponds to a different frequency in said array, and wherein the processing logic re-sorts the data structure entries when adjusting the frequency selection parameters.

4. The system of claim 3, wherein the processing logic re-sorts the data structure entries so that frequencies in said array are arranged in order of descending signal strength, the subset of shared frequencies sequentially positioned after non-shared frequencies such that when the processing logic selects the target frequency by attempting to use each frequency in said data structure sequentially, the processing logic attempts to use one of the non-shared frequencies prior to the shared frequencies.

5. The system of claim 1, wherein the processing logic identifies said subset of shared frequencies by determining average signal strengths of signals received on said array of frequencies and by locating a group of adjacent frequencies in said array having average signal strengths that are within a predetermined variance of each other.

6. The system of claim 5, wherein the processing logic adjusts said frequency selection parameters by determining differences between said average signal strengths and other signals received on the shared frequencies and by sorting said array of frequencies using said differences.

7. A non-transitory computer-readable medium encoded with software which, when executed, causes a processor to perform the following steps:
sorting a set of frequencies, a first subset of the frequencies corresponds to signals that have been transmitted using a first wireless communication protocol, a second subset of the frequencies corresponds to signals that have been transmitted using a second wireless communication protocol;
for at least one of the first subset of frequencies, determining a difference between a first signal strength value and an average signal strength value, said average signal strength value indicative of the average signal strength for signals received on said at least one of the first subset of frequencies;
re-sorting said set of frequencies in accordance with said difference; and
transmitting or receiving data on a target frequency selected from the re-sorted set of frequencies,
wherein the first and second wireless communication protocols are selected from the group consisting of Global System for Mobile Communication (GSM), Code Division Multiple Access (CDMA), and Wideband CDMA (W-CDMA).

8. The non-transitory computer-readable medium of claim 7, wherein the processor determines said average signal strength by measuring signal strengths of signals carried on said at least one of the first subset of frequencies at least three times, said processor uses Received Signal Strength Indication (RSSI) to measure said signal strengths.

9. The non-transitory computer-readable medium of claim 7, wherein the set of frequencies is re-sorted so that a first frequency in the re-sorted set of frequencies has a highest signal strength among the set of frequencies and so that a second frequency in the re-sorted set of frequencies has a second-highest signal strength among the set of frequencies.

10. The non-transitory computer-readable medium of claim 9, wherein the target frequency is selected by attempting to use the first frequency, ceasing said attempt, and subsequently attempting to use the second frequency.

11. The non-transitory computer-readable medium of claim 7, wherein the set of frequencies is re-sorted in a sequential order of descending signal strength so that a first frequency in the re-sorted set of frequencies has a highest signal strength among the set of frequencies and so that each of a plurality of subsequent frequencies in the set has a lower signal strength than a preceding frequency but a higher signal strength than a following frequency.

12. The non-transitory computer-readable medium of claim 7, wherein the computer-readable medium and processor are incorporated into a mobile communication device.

13. A method, comprising:
identifying a shared frequency carrier among a plurality of frequency carriers by locating a subset of said plurality of frequency carriers having average signal strengths that are within a predetermined variance of each other,
determining an average signal strength of signals received on the shared frequency carrier, said shared frequency carrier usable by different communication protocols;
determining a difference between said average signal strength and a signal strength of another signal received on said shared frequency carrier to produce a modified signal strength;
sorting a plurality of frequency carriers, including said shared frequency carrier, based on said modified signal strength; and
transmitting or receiving data on a target frequency carrier selected using the sorted frequency carriers.

14. The method of claim 13, wherein said different communication protocols comprise protocols selected from the group consisting of Global System for Mobile Communication (GSM), Code Division Multiple Access (CDMA), and Wideband-CDMA (W-CDMA).

15. The method of claim 13 further comprising selecting the target frequency carrier on which to transmit data by attempting to use a first frequency carrier among said sorted frequency carriers, ceasing said attempt to use the first frequency carrier, and attempting to use a second frequency carrier among said sorted frequency carriers.

16. The method of claim 15, wherein the second frequency carrier is associated with a signal strength that is weaker than that associated with the first frequency carrier, and wherein no frequency carrier among said sorted frequency carriers is associated with a signal strength stronger than that of the second frequency carrier but weaker than that of the first frequency carrier.

17. The method of claim 13, wherein sorting said plurality of frequency carriers comprises sequentially positioning the shared frequency carrier after a non-shared frequency carrier such that, when a processor is searching for a target frequency to carry data, the processor attempts to use the non-shared frequency carrier prior to the shared frequency carrier, said signal strength greater than another signal strength of the non-shared frequency carrier, said modified signal strength less than said another signal strength of the non-shared frequency carrier.

* * * * *